United States Patent
Kikuiri et al.

(10) Patent No.: US 7,106,555 B2
(45) Date of Patent: Sep. 12, 2006

(54) MAGNETIC HEAD, MAGNETIC TAPE DEVICE INCLUDING THE MAGNETIC HEAD AND METHOD FOR PRODUCING THE MAGNETIC HEAD

(75) Inventors: Katsuya Kikuiri, Niigata-ken (JP); Naruaki Oki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 168 days.

(21) Appl. No.: 10/701,343

(22) Filed: Nov. 4, 2003

(65) Prior Publication Data
US 2004/0095675 A1    May 20, 2004

(30) Foreign Application Priority Data
Nov. 6, 2002   (JP)   .............................. 2002-322676
Sep. 22, 2003  (JP)   .............................. 2003-330446

(51) Int. Cl.
*G11B 5/127*   (2006.01)
(52) U.S. Cl. .................................................... 360/125
(58) Field of Classification Search ................ 360/121, 360/125, 126, 21
See application file for complete search history.

(56) References Cited
U.S. PATENT DOCUMENTS 4,799,118 A * 1/1989 Yamada et al. ............. 360/125
4,970,615 A * 11/1990 Gau ........................... 360/126
6,563,669 B1 * 5/2003 Daby et al. ................. 360/126

FOREIGN PATENT DOCUMENTS

JP   11-328616   11/1999
JP   2001-052304   2/2001

* cited by examiner

*Primary Examiner*—Robert S. Tupper
(74) *Attorney, Agent, or Firm*—Brinks Hofer Gilson & Lione

(57) ABSTRACT

A magnetic head in which two sides, which are defined as viewed in a core width direction, of first, second, and third end surfaces of a magnetic recording head extend along a longitudinal direction of recording tracks, so that it is possible to reduce spreading of leakage magnetic field extending from the two sides of the magnetic recording head in the core width direction between an upper core layer and a lower core layer protrusion through a gap layer. If the leakage magnetic field extending from both sides of the gap layer is reduced, it is possible to prevent the formation of an erased area beyond a multiple recording area. It is possible to maintain the S/N ratio of a reproduction signal at a proper value when reading out magnetic information from a magnetic tape.

3 Claims, 15 Drawing Sheets

MAGNETIC HEAD, MAGNETIC TAPE DEVICE INCLUDING THE MAGNETIC HEAD AND METHOD FOR PRODUCING THE MAGNETIC HEAD

BACKGROUND OF THE INVENTION

1. Field of the Invention

The present invention relates to a magnetic head using a magnetic tape as a recording medium, a method for producing the magnetic head, and a magnetic tape device.

2. Description of the Related Art

As shown in FIG. 15, in performing a recording operation on a magnetic tape 101, a helical scanning method is widely used. In the helical scanning method, a rotating drum 103 including magnetic heads 102 is rotated at a high speed, and a magnetic tape 101 is placed obliquely along a peripheral surface 103a of the rotating drum 103 in order to record information onto the magnetic tape 101. As shown in FIG. 16, according to this recording method, recording tracks 105 are defined by being inclined by a predetermined angle with respect to a transport direction L (longitudinal direction) of the magnetic tape 101.

In magnetic recording by the helical scanning method, in order to record magnetic information onto the magnetic tape 101 with a density that is as high as possible, what is called a guard bandless recording method in which gaps are not formed between adjacent recording tracks 105 is generally used. In the guard bandless recording method, in order to prevent what is called crosstalk caused by entrance of a signal from a recording track 105 that is adjacent to a recording track 105 whose magnetic information is being read, first recording tracks and second tracks are alternately formed. Information is recorded along the first recording tracks 106 and the second recording tracks 107 at different azimuth angles with respect to a longitudinal direction M of the recording tracks 106 and 107.

In order to carry out such a recording method, a magnetic head 102a and a magnetic head 102b are mounted to the rotating drum 103 at different angles (see FIG. 17). The magnetic head 102a is used to record information along the first recording tracks 106, and the magnetic head 102b is used to record information along the second recording tracks 107. When magnetic information is recorded along the first recording tracks 106 and the respective second adjacent recording tracks 107 at different azimuth angles, even if guard bands are not formed between the first recording tracks 106 and the second recording tracks 107, it is possible to reduce the effects of signals from adjacent tracks due to azimuth loss.

An inductive head using a thin-film process for increasing recording density is known (refer to, for example, Japanese Unexamined Patent Application Publication No. 2001-52304 (Patent Document 1)). In addition, an inductive head comprising a lower core layer having a protruding portion for preventing magnetic spreading in the inductive head is known to be designed for a hard disc (refer to, for example, Japanese Unexamined Patent Application Publication No. 11-328616 (Patent Document 2)).

As shown in FIG. 17, in order to record information along the first recording tracks 106 and the second recording tracks 107 of the magnetic tape 101 at different azimuth angles, the magnetic heads 102a and 102b, each comprising a rectangular upper core layer 111 and a rectangular lower core layer 112, are disposed at a rotating cylinder so that the magnetic heads 102a and 102b can magnetically record information while being tilted at two respective azimuth angles with respect to the longitudinal direction M of the recording tracks 106 and 107. Multiple recording areas 110 are formed at adjoining portions of the first recording tracks 106 and the respective second adjacent recording tracks 107 taking into consideration, for example, errors in the recording positions of the magnetic heads 102a and 102b. At the multiple recording areas 110, portions of pieces of magnetic information are written upon each other by the magnetic heads 102a and 102b.

However, since end surfaces of the related magnetic heads 102a and 102b that oppose the magnetic tape 101 are formed with rectangular shapes, when the magnetic heads 102a and 102b are tilted by predetermined azimuth angles with respect to the recording tracks, magnetic fields that are generated at both sides of each of the magnetic heads 102a and 102b in a core width direction between the upper core layer 111 and the lower core layer 112 are tilted from the longitudinal direction of the recording tracks 106 and 107. Therefore, when magnetic information is being recorded along a second recording track 107 by the magnetic head 102b subsequent to recording magnetic information along a first recording track 106 by the magnetic head 102a, the effect of leakage magnetic fields F1 extending in the core width direction is increased, resulting in the possibility of the leakage magnetic field F1 extending considerably beyond the multiple recording area. As a result, the magnetic information recorded along the first recording track 106 may become magnetically erased, thereby producing an erased area 121 with a relatively wide width by the leakage magnetic field F1 extending beyond the multiple recording area 110. The erased area 121 essentially reduces track width, resulting in the possibility of an S/N ratio of a reproduction signal being reduced when recorded information is read out from the magnetic tape 101.

SUMMARY OF THE INVENTION

Accordingly, it is an object of the present invention to provide a magnetic head which makes it possible to maintain an S/N ratio of a reproduction signal at a proper value, a method for producing the magnetic head, and a magnetic tape device.

To this end, according to a first aspect of the present invention, there is provided a magnetic head comprising a magnetic recording core including an upper core layer, a lower core layer, and a gap layer disposed between the upper core layer and the lower core layer. The magnetic recording core is used to alternately form first and second recording tracks at a predetermined angle with respect to a magnetic tape transport direction. A recording operation is performed on the first and second recording tracks at different azimuth angles. A multiple recording area is disposed at adjacent portions of the first and second recording tracks, and is overwritten. A medium-sliding-surface-side end surface of at least one of the upper core layer and the lower core layer has a width that defines the width of the recording tracks. At least one side of the end surface is set in a longitudinal direction of the first and second recording tracks.

According to such a magnetic head, even if the magnetic head is inclined with respect to a recording track at a predetermined azimuth angle, a magnetic field that is generated between the upper and lower core layers of the magnetic head will not extend beyond a multiple recording area and enter a different magnetic track, thereby preventing information from being written onto a portion of the different recording track by the magnetic field that is generated between the upper and lower core layers. Therefore, it is possible to prevent the production of an erased area resulting from the magnetic field extending beyond the multiple recording area, so that an S/N ratio of a reproduction signal can be maintained at a proper value.

In a first form, two opposing sides of the end surface are set in the longitudinal direction of the first and second recording tracks. This is because this makes it possible for the volumes of ends of magnetic recording cores of two magnetic heads using the helical scanning method to be equal to each other, so that magnetic properties, such as saturation magnetic flux density, can be made the same.

In a second form, the lower core layer comprises a base and a protrusion, the base being considerably wider than the upper core layer in a core width direction of the magnetic head, the protrusion corresponding to a portion of the base protruding towards the upper core layer. The protrusion of the lower core layer minimizes the effect of leakage magnetic field between both edges of the upper core layer and the base of the lower core layer. When such leakage magnetic field at both edges is reduced, the protrusion is useful for reducing spreading of a recording operation when performing magnetic recording.

In a third form, the end surface of each of the upper core layer and the lower core layer extends to a predetermined depth in a gap depth direction with its shape being maintained. Even if wearing occurs in the magnetic head due to sliding between it and a magnetic tape, it is possible to maintain an S/N ratio of a reproduction signal at a proper value. If the above-described magnetic head is incorporated in a helical-scanning magnetic tape device, it is possible to provide a magnetic tape device whose reproduction signal has a proper S/N value.

According to a second aspect of the present invention, there is provided a method for producing a magnetic head comprising the steps of stacking a recording layer, including a lower core layer, a gap layer, and an upper core layer, upon a reference surface in a stacking direction that is perpendicular to the reference surface; and forming an inclined surface extending in a gap-depth direction and being inclined at a predetermined angle from the stacking direction at an end portion, which is defined as viewed in a core width direction, of the recording layer by digging the end portion in the gap depth direction from an end surface of the recording layer opposing a magnetic tape.

According to the method for producing a magnetic head, since, after forming a recording layer in a plane by recording, a surface of the recording layer is inclined by a predetermined angle from a stacking direction of the recording layer to form an inclined surface that extends in the gap depth direction, it is not necessary to carry out difficult steps, such as the step of obliquely stacking the recording layer itself to form such an inclined surface. Therefore, it is relatively easy to form the inclined surface, thereby making it possible to make use of existing producing processes, and to produce it at a low cost.

According to a third aspect of the present invention, there is provided a method for producing a magnetic head comprising the steps of stacking a recording layer, including a lower core layer, a gap layer, and an upper core layer, upon a reference surface in a stacking direction that is perpendicular to the reference surface; and forming an inclined surface extending in a gap depth direction and being inclined at a predetermined angle from the stacking direction at an end portion, which is defined as viewed in a core width direction, of the recording layer by digging the end portion in the stacking direction from a top surface of the recording layer using a focus ion beam. In the method, with an illuminating angle of the focus ion beam being set greater than the predetermined angle by 3 to 8 degrees, the end portion of the recording layer is dug using the focus ion beam, so that the inclined surface is formed. Here, with the recording layer being formed on a wafer, the inclined surface may be formed.

According to a fourth aspect of the present invention, there is provided a method for producing a magnetic head comprising the steps of stacking a recording layer, including a lower core layer, a gap layer, and an upper core layer, upon a reference surface in a stacking direction that is perpendicular to the reference surface; and forming an inclined surface extending in a gap depth direction and being inclined at a predetermined angle from the stacking direction at an end portion, which is defined as viewed in a core width direction, of the recording layer by digging the end portion in the gap depth direction from an end surface of the recording layer opposing a magnetic tape using a focus ion beam. In the method, with an illuminating angle of the focus ion beam being set at an angle of 3 to 8 degrees with respect to the gap depth direction, the end portion of the recording layer is dug using the focus ion beam, so that the inclined surface is formed.

According to the magnetic head of the present invention, since at least one side of an end surface, where the upper core layer and the lower core layer on both sides of the gap layer oppose the magnetic tape, extends in the longitudinal direction of the first and second recording tracks, even if the magnetic head is inclined with respect to a recording track at a predetermined azimuth angle, a magnetic field that is generated between the upper and lower core layers of the magnetic head will not extend beyond a multiple recording area and enter a different magnetic track, thereby preventing information from being written onto a portion of the different recording track by the magnetic field that is generated between the upper and lower core layers. Therefore, it is possible to prevent the production of an erased area resulting from the magnetic field extending beyond the multiple recording area, so that an S/N ratio of a reproduction signal can be maintained at a proper value. The effect of leakage magnetic field at both edges of the upper core layer on the magnetic tape is minimized by the inclination at the azimuth angle.

Since the lower core layer comprises a base, which is wider than the upper core layer in the core width direction of the magnetic head, and a protrusion, which is a portion of the base that protrudes towards the upper core layer, the effect of leakage magnetic field that is generated between the base and both edges of the upper core layer is prevented from becoming increased. When the effect of the leakage magnetic field that is generated at both edges is reduced, the protrusion is useful for reducing spreading of a recording operation when performing magnetic recording. If the above-described magnetic head is incorporated in a magnetic tape device, it is possible to provide a magnetic tape device whose reproduction signal has a proper S/N value.

According to the method for producing the magnetic head of the present invention, a recording layer is formed on a reference surface in a direction perpendicular to the stacking direction, and an end portion of the recording layer in the core width direction is dug in the gap depth direction from an end surface where the recording layer opposes the magnetic tape, and is inclined by a predetermined angle from the stacking direction to form an inclined surface that extends in the gap depth direction. Therefore, it is not necessary to carry out difficult steps, such as the step of obliquely stacking the recording layer of the magnetic recording head to form such an inclined surface. Therefore, it is possible to relatively easily form the inclined surface. In addition, if both sides of the magnetic recording head in the core width direction are milled at the same time, the sizes of two magnetic recording heads can be made the same, so that recording tracks can be formed with high precision with the recording levels with respect to the magnetic tape being made the same.

If an inclined surface is formed by irradiation with a focus ion beam at an illuminating angle that is from 3 to 8 degrees greater than the predetermined angle at which the inclined surface is inclined with respect to the stacking direction, it is possible to eliminate the effects of ion density distribution and form the inclined surface with an angle that is the same as a predetermined designing angle.

DESCRIPTION OF THE PREFERRED EMBODIMENTS

Figure 1:
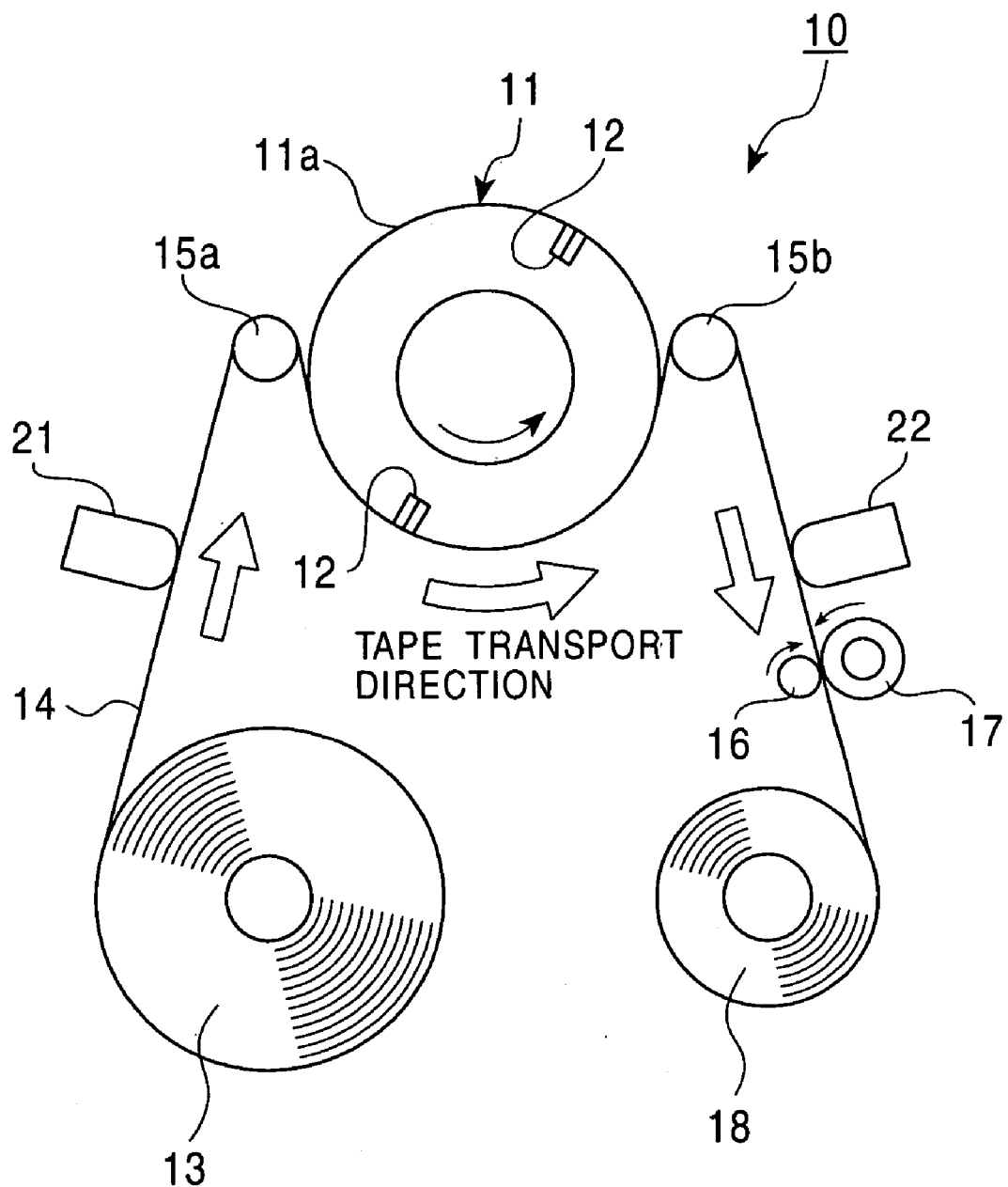
FIG. 1 is a plan view illustrating in simplified form a tape loading system path of a magnetic tape device of a first embodiment of the present invention.

Hereunder, a description of embodiments of the present invention will be given with reference to the drawings. A magnetic tape device using a magnetic tape as a recording medium is used as an embodiment of the present invention. FIG. 1 is a plan view illustrating in simplified form a tape loading system path of a helical-scanning magnetic tape device. A magnetic tape device 10 comprises a rotating head drum 11 that is rotationally driven by a motor (not shown).

Figure 11:
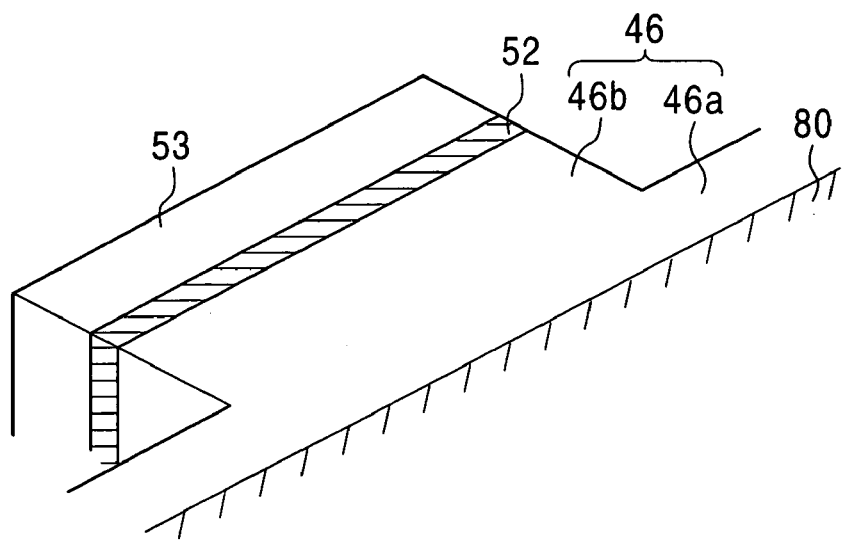
FIG. 11 illustrates a method for producing a magnetic head of the present invention.

Two magnetic heads 12 of the present invention are mounted to the rotating head drum 11. At a location between two guide posts 15a and 15b, a portion of a magnetic tape (magnetic recording medium) 14 that has been supplied from a supply tape reel 13 of a tape cassette is pushed against a peripheral surface 11a of the rotating head drum 11. Then, the portion of the magnetic tape 14 is nipped between a capstan 16 and a pinch roller 17, and wound up by a take-up tape reel 18. The above-described structure is used for a tape storage structure. When the embodiment is applied to a video cassette recorder (VCR) structure, a full-width erasing head 21 and a sound head 22 are further disposed separately in the tape loading system path, as shown in FIG. 11.

Figure 2:
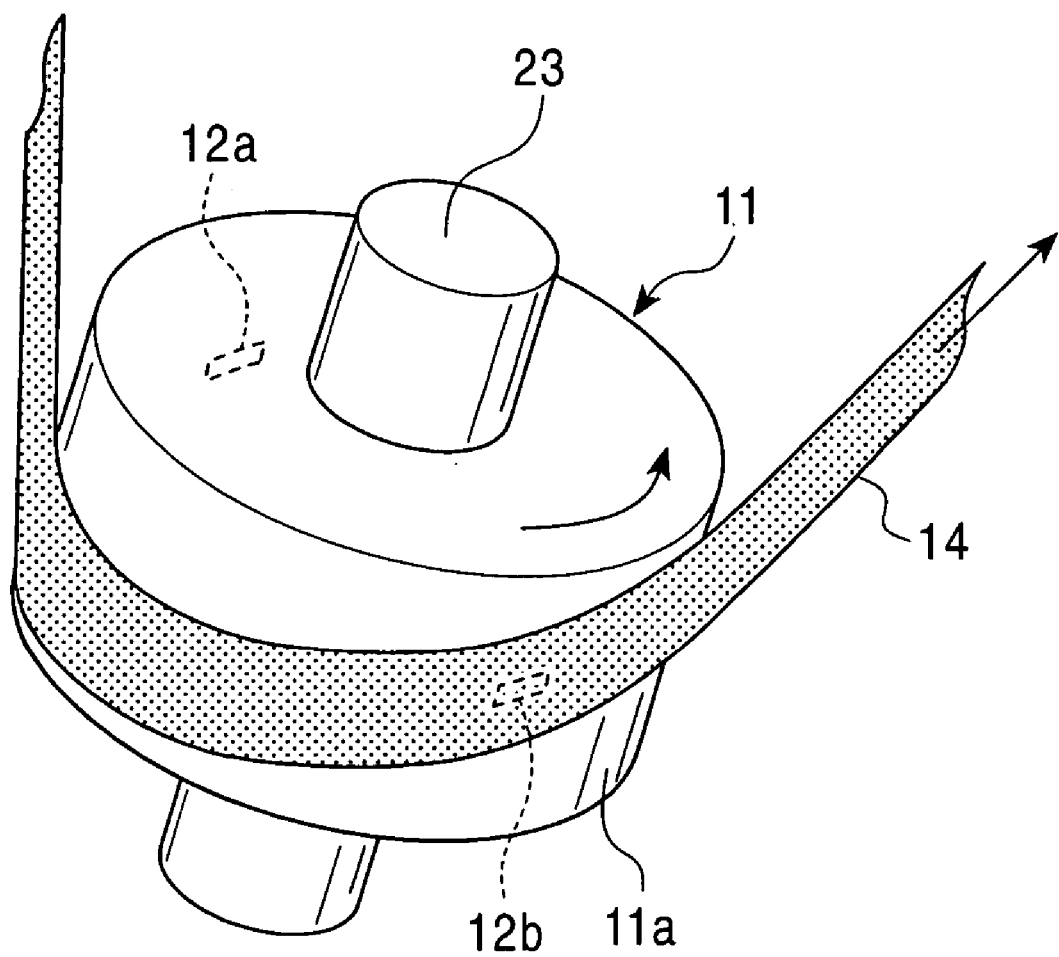
FIG. 2 is an enlarged perspective view of a rotating head drum shown in FIG. 1.

As shown in FIG. 2, the rotating head drum 11 rotates around a rotating shaft 23, as a center, that is driven by a motor. The magnetic tape 14 moves while being obliquely pushed against the peripheral surface 11a of the rotating head drum 11. Exposed surfaces of two magnetic heads 12a and 12b are disposed at the peripheral surface 11a of the rotating head drum 11 so that they alternately contact the magnetic tape 14 at locations of the magnetic tape 14 that are separated by, for example 180 degrees. The two magnetic heads 12a and 12b are disposed so as to record information onto the magnetic tape 14 at different recording angles.

Figure 3A:
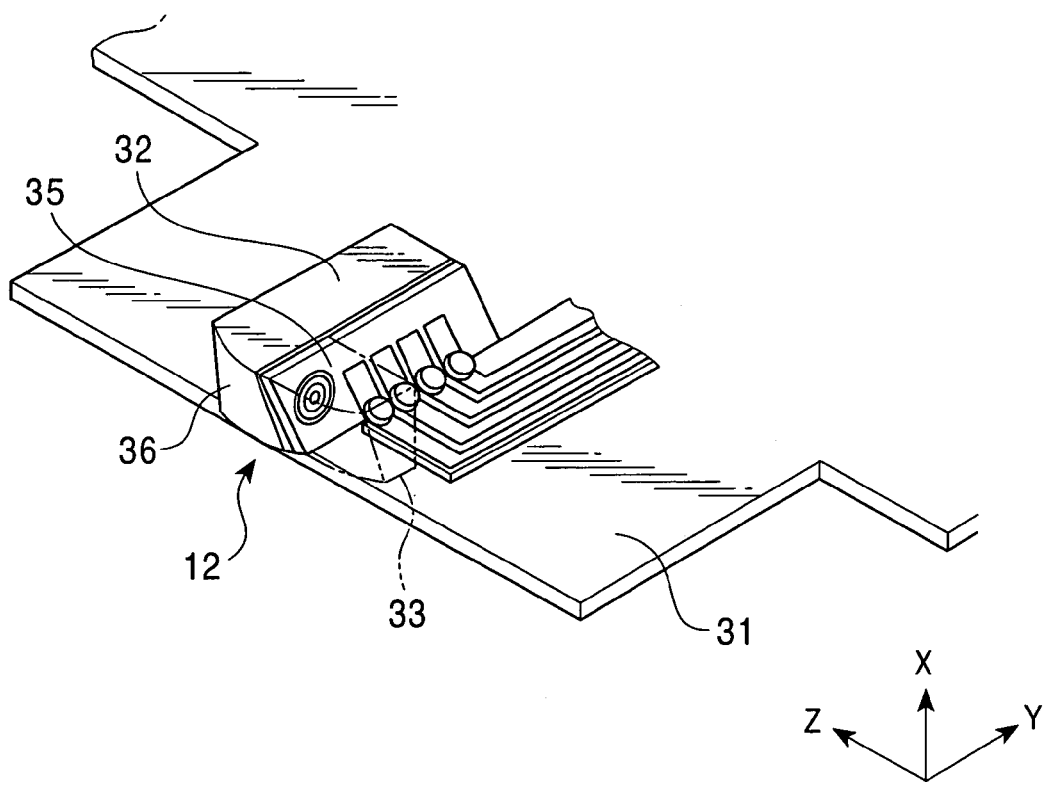
FIGS. 3A and 3B are a perspective view and a plan view schematically showing a magnetic head.
Figure 3B:
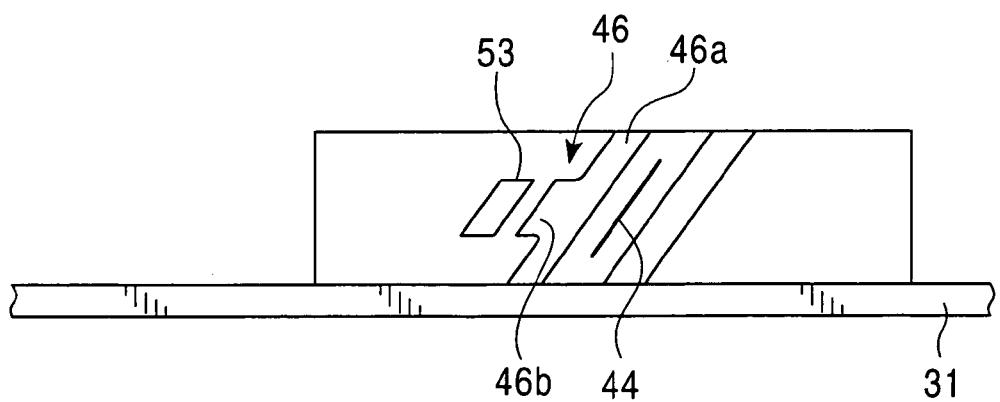

FIG. 3A is a schematic perspective view showing one of the magnetic heads 12. FIG. 3B is an enlarged plan view of the magnetic head 12 as seen from a medium sliding surface side. The magnetic head 12 is formed by integrally forming block-shaped semi-cores 32 and 33 as a result of adhering side end surfaces of the semi-cores 32 and 33 through a core-incorporating layer 35. Accordingly, the magnetic head 12 has an overall block shape. One surface of the adhered semi-cores 32 and 33 is adhered to a base plate 31. One side of the adhered semi-cores 32 and 33 is secured to the base plate 31 so as to protrude slightly outward from an end of the base plate 31. A tape sliding surface of the magnetic head 12 that protrudes outward from the base plate 31 is processed into a concave shape in order to form a medium sliding surface 36 that opposes a magnetic recording medium such as a magnetic tape.

Figure 4:
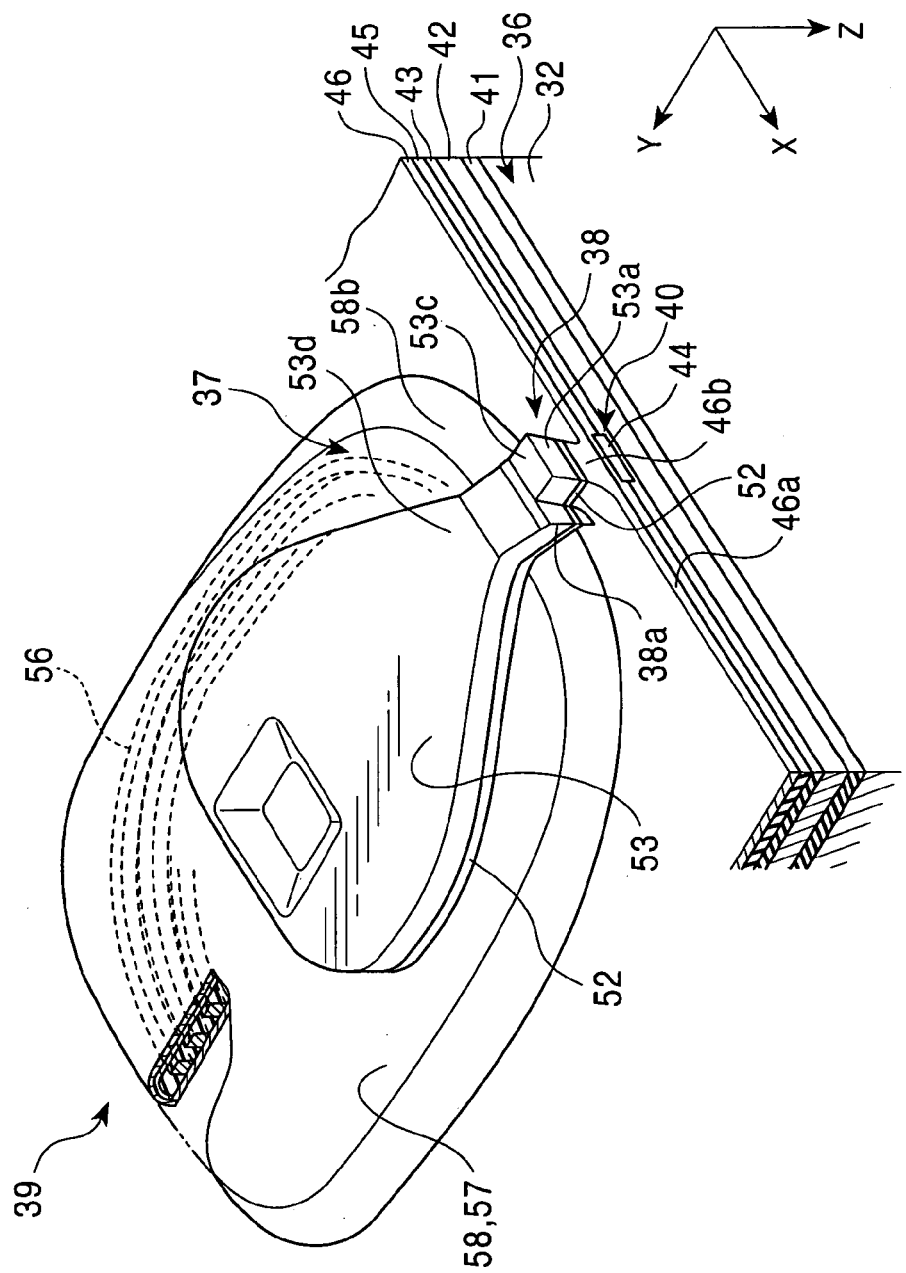
FIG. 4 is a perspective view showing the structure of the magnetic head in detail.
Figure 5:
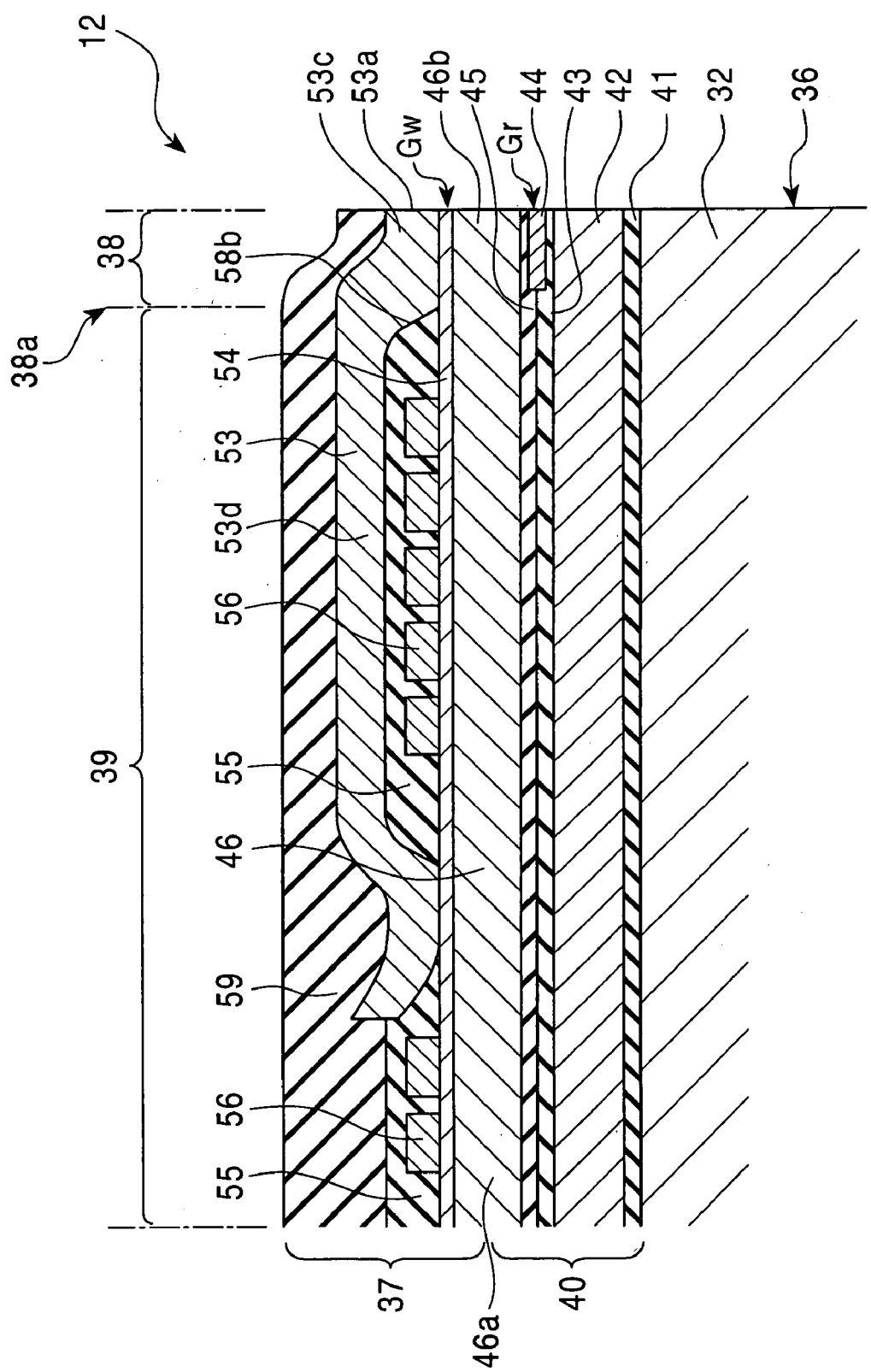
FIG. 5 is a sectional side view of the magnetic head shown in FIG. 3.

As shown in FIGS. 4 and 5, a magnetic recording head 37 that forms the main portion of the magnetic head 12 of the present invention is incorporated in the core-incorporating layer 35. In FIGS. 4 and 5, the magnetic recording head 37 is formed above the semi-core 32 by a magnetic pole end 38 and a magnetic pole base 39. The magnetic pole end 38, includes the medium sliding surface 36. The magnetic pole base 39 is disposed adjacent to the magnetic pole end 38 and apart from the medium sliding surface 36. A reproducing head 40 comprising a magnetoresistive (MR) element is disposed below the magnetic recording head 37.

In the reproducing head 40, an underlying insulating layer 41, a lower shield layer 42, a lower insulating layer 43, a magnetoresistive element (hereinafter referred to as "MR element") 44, an upper insulating layer 45, and a lower core layer 46 are successively stacked upon the semi-core 32. The MR element 44 is exposed at the medium sliding surface 36. The lower core layer 46 comprises a base 46a and a protrusion 46b. The base 46a extends on the semi-core 32. The protrusion 46b protrudes from the central portion of the base 46a by a predetermined width along the medium sliding surface 36. The lower core layer 46 is also the lower core layer of the magnetic recording head 37, and protects the reproducing head 40.

The magnetic recording head 37 primarily comprises a magnetic recording core 50 including the lower core layer 46 for protecting the reproducing head 40, a nonmagnetic gap layer 52, and an upper core layer 53 that is formed above the gap layer 52. In the magnetic pole end 38, the lower core layer 46, the gap layer 52, and the upper core layer 53 (53c) are exposed at the medium sliding surface 36 in a successively stacked state. At the medium sliding surface 36, an end 53a of the upper core layer 53 opposes the lower core layer 46 so as to be separated by a very small gap through the gap layer 52. By this, a recording gap Gw is formed.

In the magnetic pole base 39, the gap layer 52 is stacked upon the top surface of the lower core layer 46. A magnetic coil layer 56, which is spirally patterned in plan view, is formed on top of the gap layer 52, and is covered with an insulating layer 55.

The upper core layer 53 is formed on top of the insulating layer 55. The upper core layer 53 comprises at least two portions, that is, a pole 53c and a yoke 53d. The pole 53c is disposed at the side of the magnetic pole end 38 and is exposed at the medium sliding surface 36. The yoke 53d is disposed at the side of the magnetic pole base 39 and is adjacent to the pole 53c. The pole 53c and the yoke 53d are divided by a boundary 38a between the magnetic pole end 38 and the magnetic pole base 39. The top surface of the upper core layer 53 is covered with a protective insulating layer 59.

The structure of an end portion of the magnetic recording head 37 will be described in detail with reference to FIGS. 6 and 7. In an end surface 61 (end surface opposing the magnetic tape) of the upper core layer 53 that is disposed at the side of the magnetic pole end 38, two sides 61a and 61a, which are defined as viewed in a core width direction, are inclined at an angle of θ with respect the core width direction of the magnetic recording head 37 (that is, a Z direction in FIG. 6). It is desirable that the angle θ be equal or approximately equal to, for example, an azimuth angle at which recording is carried out on a recording track of a magnetic tape. On the other hand, upper and lower sides 61b and 61b of the end surface 61 extend substantially parallel to the core width direction of the magnetic recording head 37 (that is, the Z direction in FIG. 6).

Sides 62a and 62a, which are defined as viewed in the core width direction, of an end surface 62 of the gap layer 52 that is disposed at the side of the magnetic pole end 38 (end surface opposing the magnetic tape) are also inclined at the angle θ with respect to the core width direction of the magnetic recording head 37 (that is, the Z direction in FIG. 6), and are formed consecutively on lines extending from the respective sides 61a and 61a of the upper core layer 53. Sides 63a and 63a, which are defined as viewed in the core width direction, of an end surface 63 of the protrusion 46b that is disposed at the side of the magnetic pole end 38 (end surface opposing the magnetic tape) are also inclined at the angle θ with respect to the core width direction of the magnetic recording head 37 (that is, the Z direction in FIG. 6), and are formed consecutively on lines extending from the respective sides 61a and 61a of the upper core layer 53.

Figure 6:
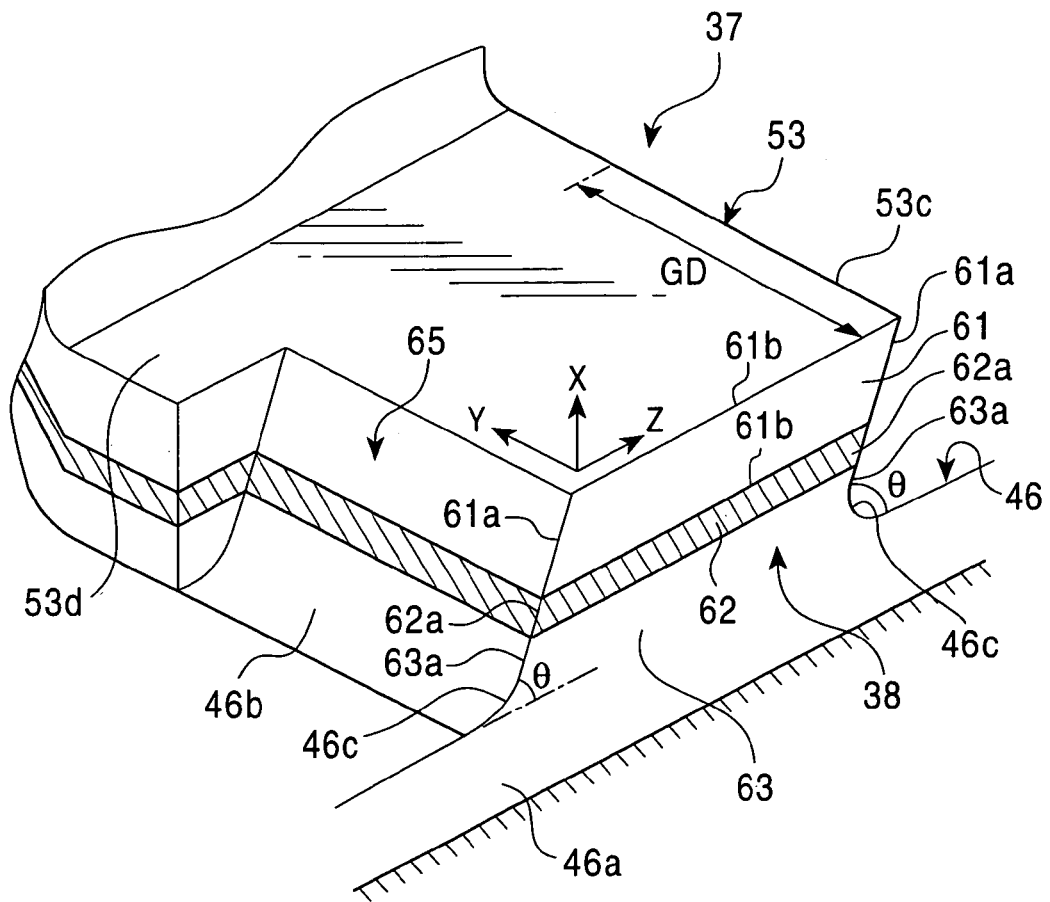
FIG. 6 is an enlarged perspective view showing the structure of a medium sliding surface side of the magnetic head in detail.
Figure 7:
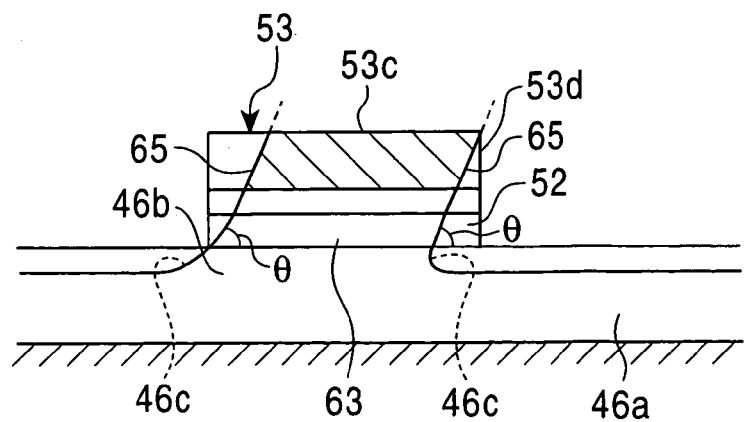
FIG. 7 is a plan view showing the forms of a pole and a yoke of an upper core layer.

In this way, the sides 61a, the sides 62a, and the sides 63a of the respective end surfaces (medium opposing surfaces) 61, 62, and 63 of the respective upper core layer 53, the gap layer 52, and the protrusion 46b are inclined at the angle θ that is approximately equal to the azimuth angle that is formed with respect to the core width direction of the magnetic recording head 37 (that is, the Z direction in FIG. 6). Curved portions 46c, which are gently inclined, are formed at a portion where the base 46a and the protrusion 46b of the lower core layer 46 are joined. The protrusion 46b makes it possible to prevent leakage magnetic fields from being generated between the sides 61a and 61a of the upper core layer 53 and the base 46a at both sides of the curved portions 46c and 46c. In this way, if the effect of leakage magnetic field at both edges is reduced, the protrusion 46b is useful for reducing spreading of a recording operation when performing magnetic recording.

With the forms of the end surfaces 61, 62, and 63 being maintained, the upper core layer 53, the gap layer 52, and the protrusion 46b extend in a gap depth (GD) direction. By this, two parallel inclined surfaces 65 and 65, which extend in the gap depth (GD) direction from the sides 61a, the sides 62a, and the sides 63a, are formed along the upper core layer 53, the gap layer 52, and the protrusion 46b, at the side of the magnetic pole end 38. The two inclined surfaces 65 and 65, which extend in the gap depth (GD) direction from both sides of the end surfaces 61, 62, and 63 in the core width direction, are inclined at an angle θ that is approximately equal to the azimuth angle with respect to the core width direction (Z direction in FIG. 6). It is preferable that the angles θ be equal to the azimuth angle. They may be inclined at an angle that is greater than the azimuth angle by approximately 1 to 25 degrees. Therefore, although it is desirable that the sides 61a be parallel to a longitudinal direction M (described later), they may be inclined from 1 to 25 degrees.

The inclined surfaces 65 and 65, which are formed at the magnetic pole end 38 of the protrusion 46b, extend to a portion where the yoke 53d and the pole 53c of the upper core layer 53 are connected. Recesses are formed at respective sides of the inclined surfaces 65 and 65 in the core width direction during a producing process (described later). The recesses are substantially trapezoidal openings that are defined by the inclined surfaces 65 and 65, the upper surface of the base 46a, and the lower surface of the protective insulating layer 59. The recesses may be embedded with an insulating material such as alumina ($Al_2O_3$).

Figure 8:
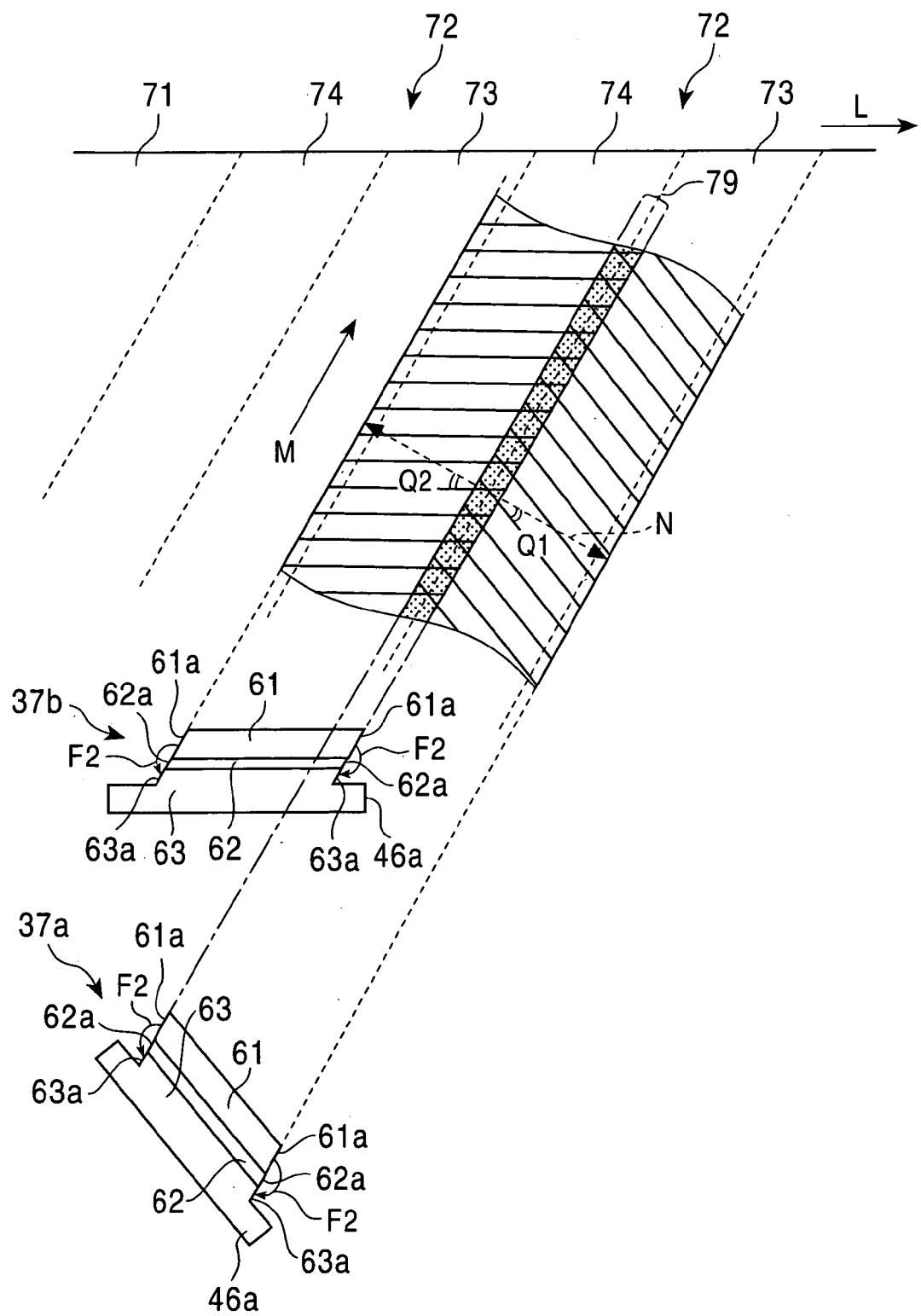
FIG. 8 illustrates the operation of the magnetic head of the present invention.

The operation of the magnetic recording head 37 of the magnetic tape device 10 having the above-described structure will be described with reference to FIGS. 2 and 8. A magnetic recording head 37a of the magnetic head 12a of the two magnetic heads 12, which are embedded in the peripheral surface 11a of the rotating head drum 11, records magnetic information along a first recording track 73 of recording tracks 72 of a magnetic tape 71. A magnetic recording head 37b of the magnetic head 12b records magnetic information along a second recording track 74 of the recording tracks 72 of the magnetic tape 71. The first and second recording tracks 73 and 74 are alternately disposed on the magnetic tape 71 at a predetermined angle with respect to a longitudinal direction L of the magnetic tape 71.

Multiple recording areas 79 are formed at adjacent portions of the first recording tracks 73 and the respective second recording tracks 74. At each multiple recording area 79, an end of a recording track 73 along which information is previously recorded is overwritten with information that is subsequently recorded onto an end of a recording track 74. Such multiple recording areas 79 serve as margins for displacement of a recording position caused by, for example, a feeding error of the magnetic tape 71.

Magnetic information is recorded along the first tracks 73 and the second recording tracks 74 at different azimuth angles, respectively. Magnetic information is recorded along each first recording track 73 at a plus azimuth angle Q1 with respect to a widthwise direction N of each recording track 72. Magnetic information is recorded along each second recording track 74 at a minus azimuth angle Q2 with respect to the widthwise direction N of each recording track 72. In this way, even if guard bands are not formed between adjacent tracks, by recording magnetic information along the adjacent recording tracks 72 at different azimuth angles, it is possible to reduce the effects resulting from a recording signal of an adjacent track being picked up.

The magnetic head 12a is mounted to the peripheral surface 11a of the rotating head drum 11 so that magnetic recording can be carried out at the plus azimuth angle Q1 with respect to the widthwise direction N of the recording tracks 72. Similarly, the magnetic head 12b is mounted to the peripheral surface 11a of the rotating head drum 11 so that magnetic recording can be carried out at the minus azimuth angle Q2 in the widthwise direction N of the recording tracks 72. By this, the magnetic recording head 37a performs magnetic recording on the first recording tracks 73 at the plus azimuth angle Q1, and the magnetic recording head 37b performs magnetic recording on the second recording tracks 74 at the minus azimuth angle Q2.

Subsequent to recording magnetic information on, for example, a particular recording track 73, when magnetic recording is carried out on a second adjacent recording track 74, since the sides 61a, 62a, and 63a, which are defined as viewed in the core width direction, of the respective end surfaces 61, 62, and 63 of the magnetic recording head 37b extend in the longitudinal direction M of the recording tracks 72, portions of the end surfaces (medium opposing surfaces) 61, 62, and 63 of the magnetic recording head 37b do not go beyond the multiple recording area 79 and enter the first recording track 73 when performing magnetic recording onto the second track 74. Therefore, when recording information along the second recording track, it is possible to prevent information from being written onto the first recording track 73 as a result of a portion of the end surfaces 61, 62, and 63 going beyond the multiple recording area 79.

Since the sides 61a and 61a, the sides 62a and 62a, and the sides 63a and 63a extend along the longitudinal direction M of the recording tracks 72, it is possible to reduce spreading of leakage magnetic fields F2 extending from both sides of the magnetic recording head 37b in the core width direction between the upper core layer 53 and the protrusion 46b through the gap layer 52. If the leakage magnetic fields F2 extending from both sides of the gap layer 52 are reduced, it is possible to minimize the formation of an erased area disposed beyond the multiple recording area 79. In this way, if it is possible to prevent the formation of an erased area disposed beyond the multiple recording area 79, it is possible to maintain a reproduction signal at a proper S/N Value when reading magnetic information from the magnetic tape 71.

As shown in FIG. 6, since the upper core layer 53, the gap layer 62, and the protrusion 46b of each of the magnetic recording heads 37a and 37b extend in the gap depth (GD) direction with the forms of the end surfaces 61, 62, and 63 being maintained, even if the medium sliding surfaces of the magnetic recording heads 37a and 37b are worn and are slightly abraded in the gap depth (GD) direction, the magnetic recording heads 37a and 37b retain their function of preventing formation of an erased area beyond a multiple recording area 79.

If, instead of extending the sides 61a, the sides 62a, and the sides 63a of the respective end surfaces 61, 62, and 63 of each of the magnetic recording heads 37a and 37b in the longitudinal direction M of the recording tracks 72, at least the side 61a, the side 62a, and the side 63a used for overwriting are extended in the longitudinal direction M of the recording tracks 72, it is possible to prevent the formation of an erased area beyond a multiple recording area 79. In addition, among the sides 61a, the sides 62a, and the sides 63a of the end surfaces (medium opposing surfaces) 61, 62, and 63, the sides 61a and 61a of the end surface 61 of the upper core layer 53 of each of the magnetic recording heads 37a and 37b may only be extended along the longitudinal direction M of the recording tracks 72.

Figure 9:
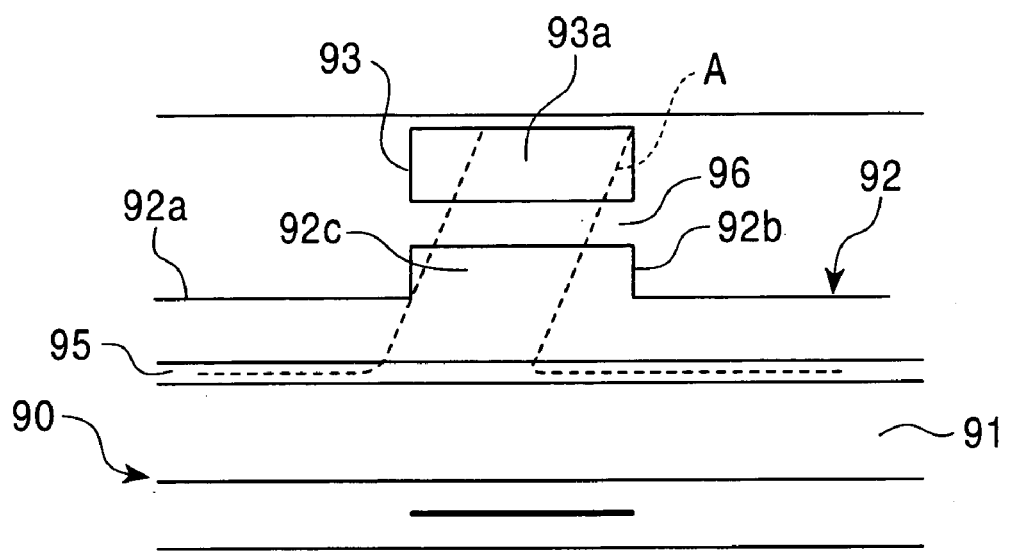
FIG. 9 is a sectional view of a magnetic head of a second embodiment of the present invention that is being molded.

Both side surfaces of the lower core layer of each of the magnetic recording heads 37a and 37b may be as a whole aligned in the longitudinal direction of the recording tracks. As shown in FIG. 9, in a second embodiment of the present invention, a separating layer 95 is formed on a protective insulating layer 91 of a reproducing head 90, and a lower core layer 92 including a base 92a and a protrusion 92b is formed on top of the separating layer 95. An upper core layer 93 is formed above the lower core layer 92 with a gap layer 96 being formed therebetween.

Figure 10:
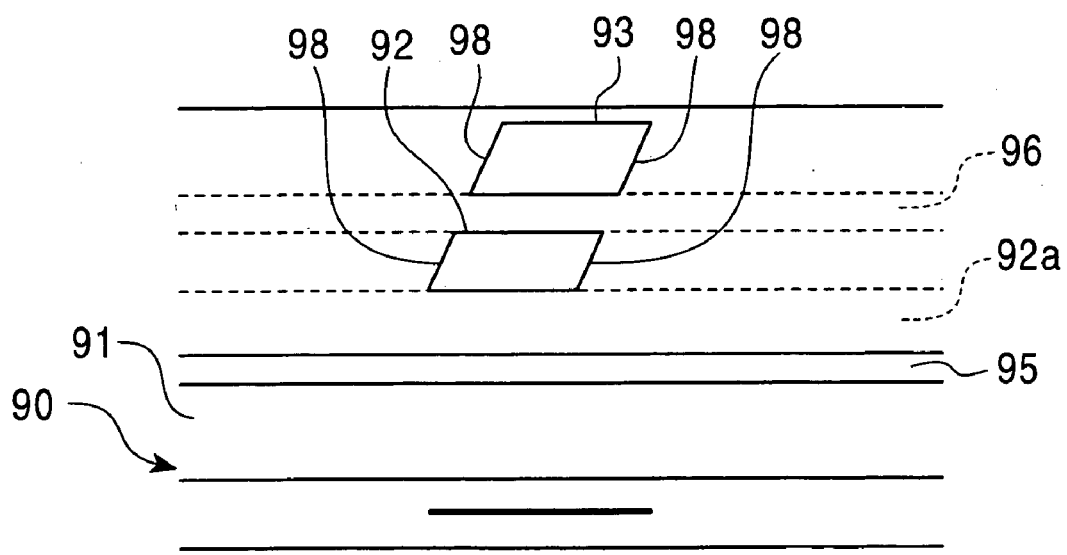
FIG. 10 is a sectional view of the magnetic head of the second embodiment of the present invention.

From an end surface 93a of the upper core layer 93 and an end surface 92c of the lower core layer 92 to the separating layer 95, both sides of the upper core layer 93 and the lower core layer 92, including the base 92a, are cut away at a predetermined inclination angle in the gap depth direction by, for example, a milling step (refer to broken line A in FIG. 9). In the magnetic head of the second embodiment that is formed in this way, as shown in FIG. 10, both sides 98 of an end portion of each of the lower core layer 92 and the upper core layer 93 are as a whole aligned in the longitudinal direction of the recording tracks. By aligning them in the longitudinal direction of the recording tracks up to an area to the base 92a, it is possible to effectively reduce magnetic fields that leak from both side surfaces of the upper core layer 93 to the lower core layer 92 by fringing. The separating layer 95 makes it possible to maintain the shielding effect of the reproducing head at a high value.

Next, a method for producing a magnetic head 12 of the present invention will be described while focusing on a step for forming inclined surfaces 65 at the magnetic pole end 38 of a magnetic recording head 37. As shown in FIG. 11, in producing the magnetic recording head 37, a lower core layer 46, including a base 46a and a protrusion 46b, an upper core layer 53, and a gap layer 52 are formed on a substrate 80 (reference surface), such as a semi-core.

Figure 12:
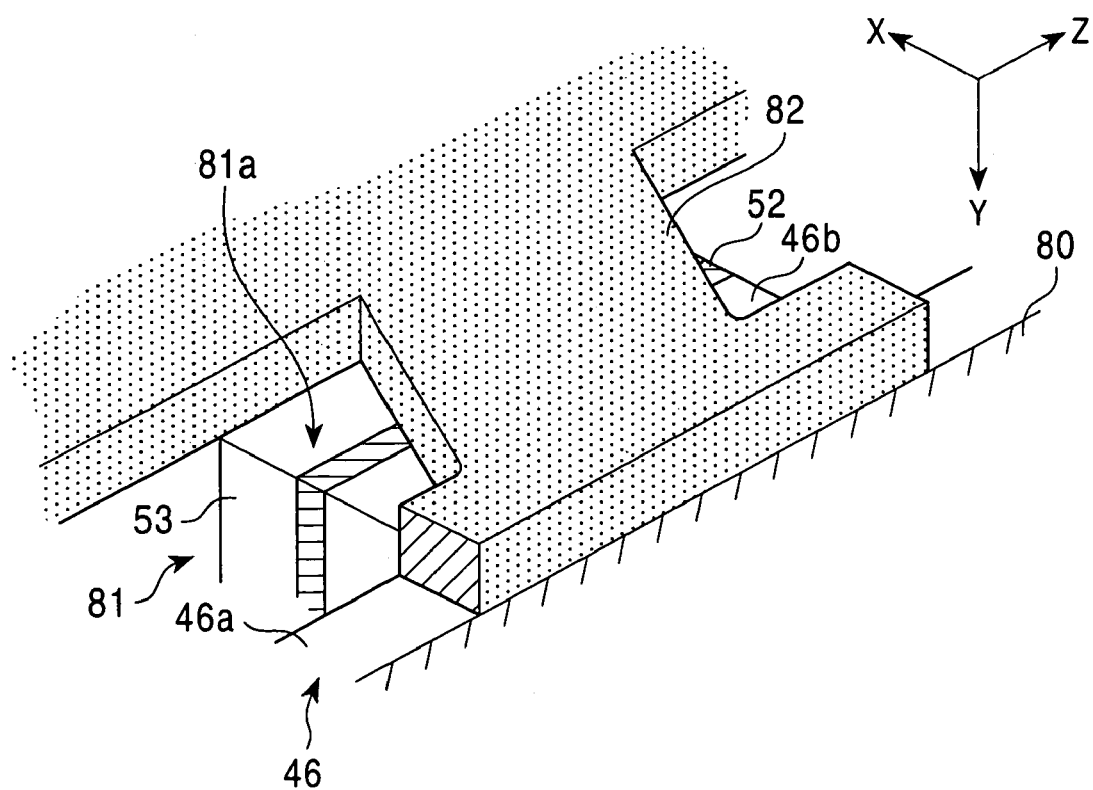
FIG. 12 illustrates the method for producing a magnetic head of the present invention.

Next, as shown in FIG. 12, a resist layer 82 is formed so as to cover a portion of an end surface 81a of a recording layer 81 that is formed by the lower core layer 46, the gap layer 52, and the upper core layer 53. The resist layer 82 is inclined at the portion where it covers the end surface 81a at a predetermined angle (for example, an azimuth angle) with respect to a stacking direction X of the recording layer 81. The resist layer 82 has the shapes of the end surfaces 61, 62, and 63 of the magnetic recording head 37 shown in FIG. 6.

Next, with the resist layer 82 being a mask, ion milling is carried out in a gap depth direction Y from the end surface 81a of the recording layer 81, and both sides of the recording layer 81 in a core width direction Z are obliquely cut away. The ion milling is carried out up to a predetermined gap depth. After completing the ion milling, the resist layer 82 is removed.

Figure 13:
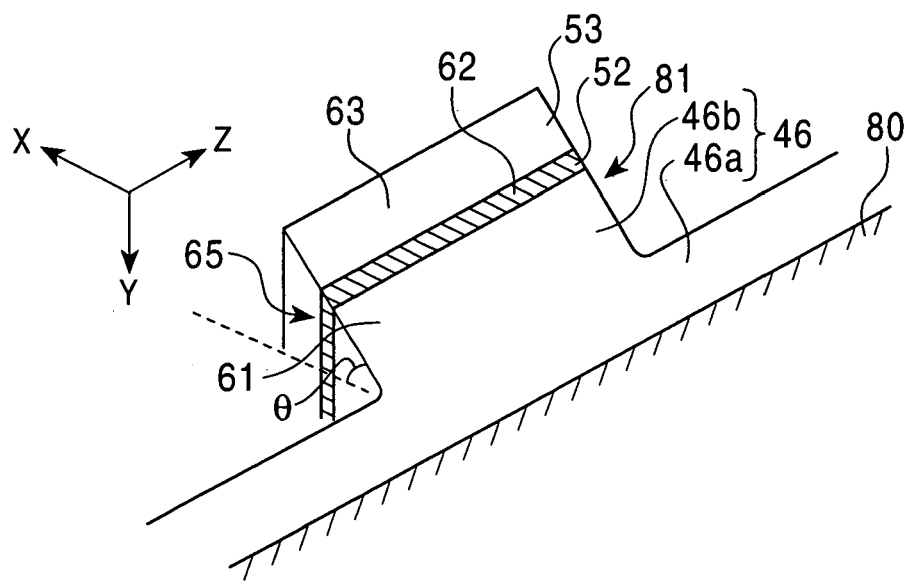
FIG. 13 illustrates the method for producing a magnetic head of the present invention.
Figure 14:
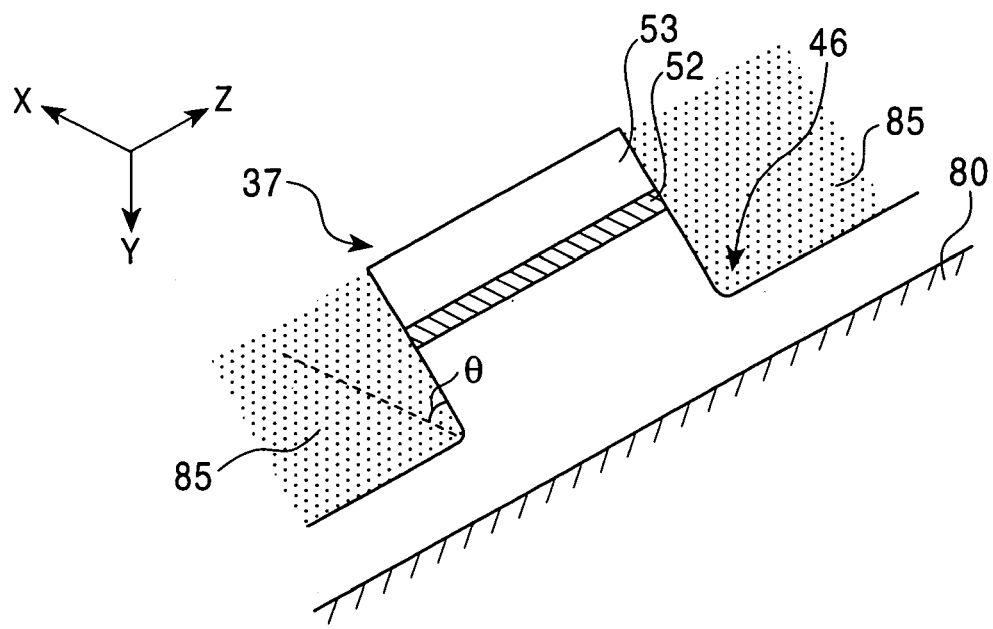
FIG. 14 illustrates the method for producing a magnetic head of the present invention.
Figure 15:
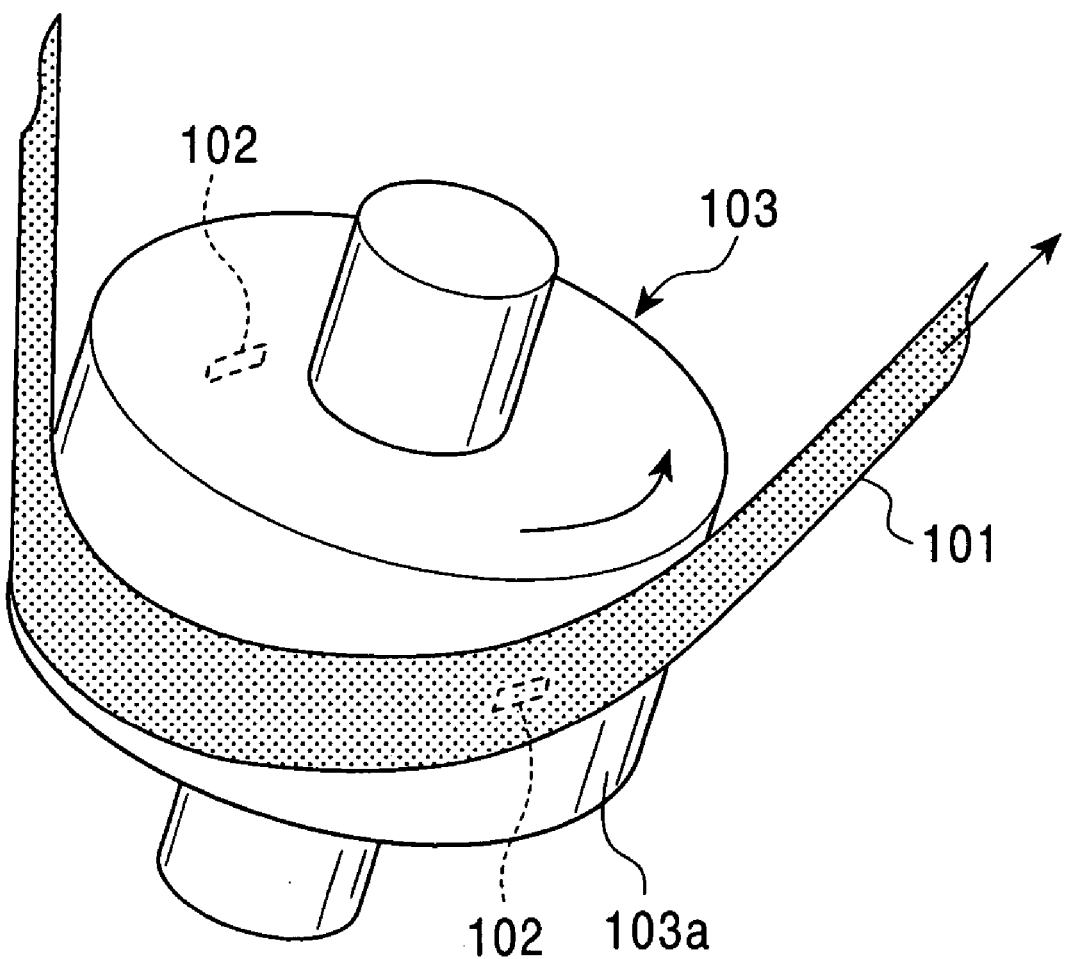
FIG. 15 is an enlarged perspective view of a related rotating head drum.
Figure 16:
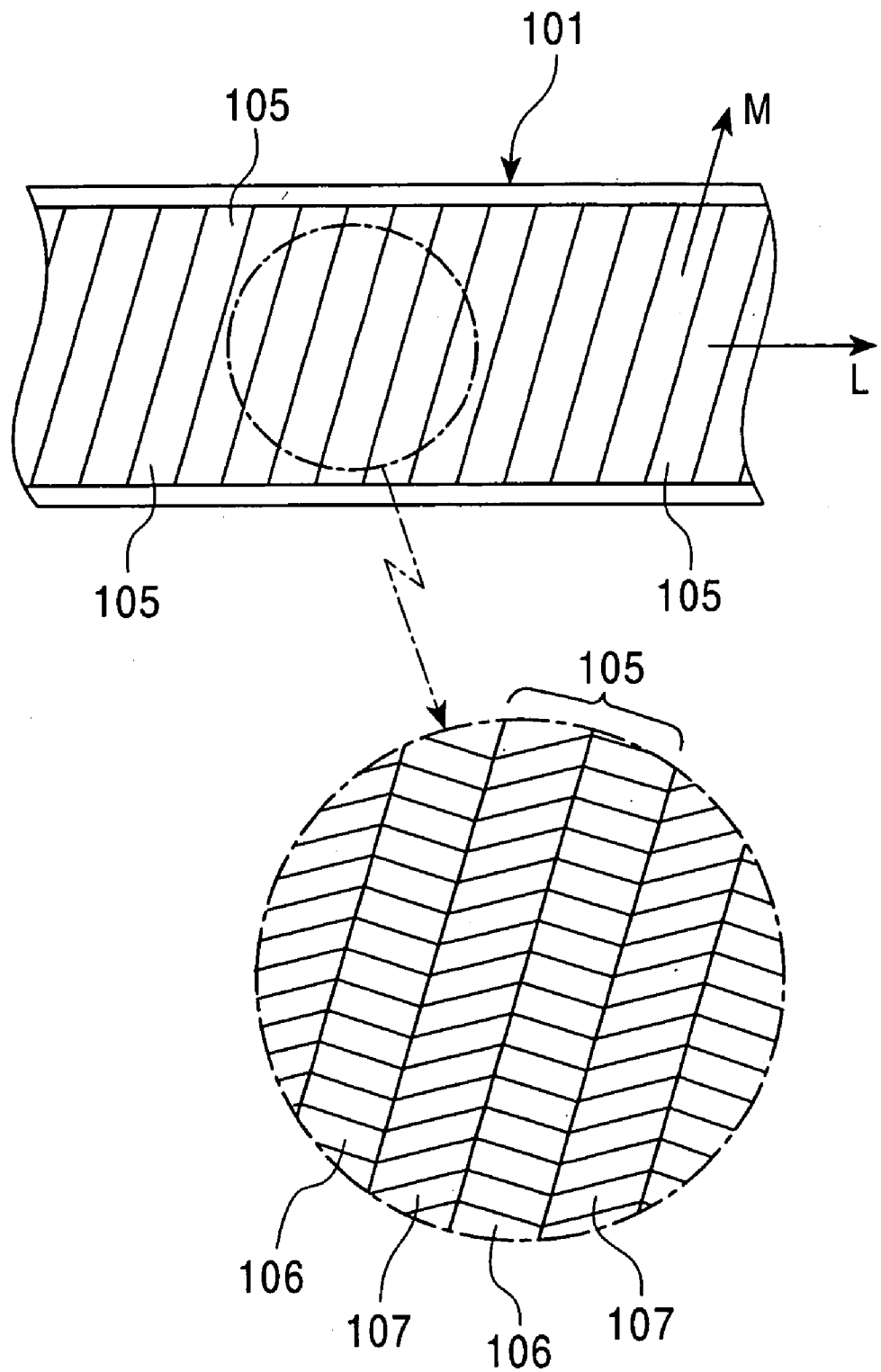
FIG. 16 schematically illustrates magnetic recording onto a magnetic recording medium.
Figure 17:
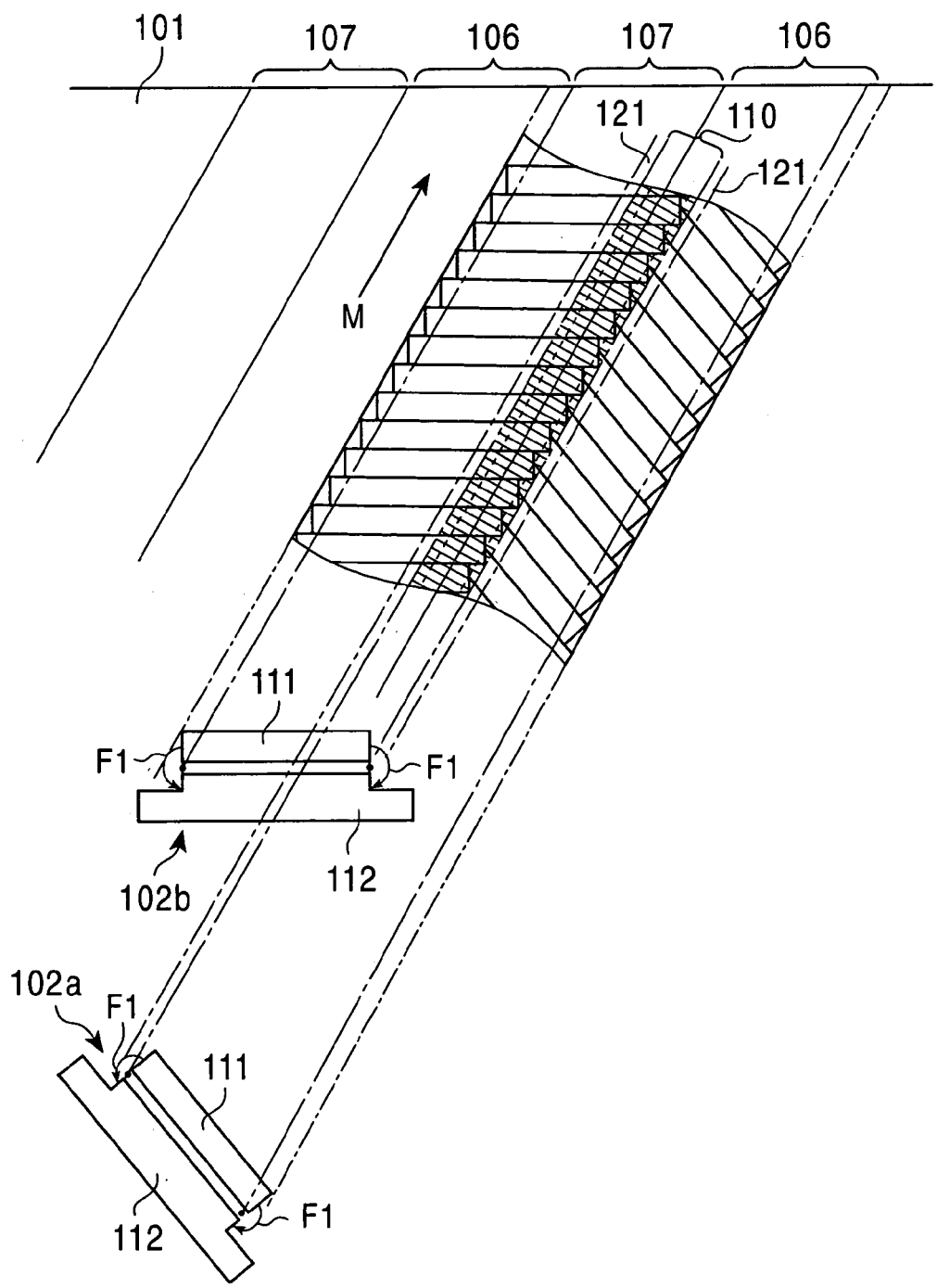
FIG. 17 schematically illustrates magnetic recording by related magnetic heads.

When the resist layer 82 having the shapes of the end surfaces 61, 62, and 63 of the magnetic recording head 37 is used as a mask for the ion milling, as shown in FIG. 13, the inclined surfaces 65, which extend in the gap depth direction, are formed on respective sides, which are defined as viewed in the core width direction, of the protrusion 46b, the gap layer 52, and the upper core layer 53 of the recording layer 81. Both sides of the end surfaces 61, 62, and 63 of the respective protrusion 46b, gap layer 52, and upper core layer 53 are inclined at a predetermined angle θ (for example, an azimuth angle) in the stacking direction X. Thereafter, as shown in FIG. 14, an insulating layer 85, such as an alumina layer, is embedded in spaces at both sides of the inclined surfaces 65, and a tape sliding surface is desirably polished for finishing. In this way, end portions of the magnetic recording head 37 in which both sides of the end surfaces 61, 62, and 63 are inclined by the predetermined angle θ (for example, an azimuth angle) with respect to the stacking direction X are formed.

As can be understood from the foregoing description, according to the method for producing the magnetic head of the present invention, since, in an ordinary process, the recording magnetic head is stacked upon the substrate 80 (the reference surface), the resist layer 82 inclined with respect to the stacking direction is then formed, and both sides, which are defined as viewed in the core width direction, of the magnetic recording head are cut away to form the inclined surfaces, it is not necessary to perform difficult steps, such as obliquely stacking the magnetic recording head for forming the inclined surfaces. By milling at the same time both sides, which are defined as viewed in the core width direction, of the magnetic recording head, it is possible for two helical scanning magnetic recording heads to have the same size. In this way, if the size of two magnetic recording heads can be the same, the recording levels with respect to a magnetic tape can be the same. Accordingly, recording tracks can be formed with high precision.

In producing the magnetic head of the present invention, when two parallel inclined surfaces 65 and 65 that extend in the gap depth (GD) direction are formed, it is desirable to dig the recording layer that is disposed on a wafer in the stacking direction thereof using a focus ion beam (FIB).

The focus ion beam (FIB) is closer to a straight line than an ion beam used in general milling, so that high-precision processing is easily carried out. However, when, for example, vertical surfaces are formed by a cutting operation using a focus ion beam, processing surfaces are finished with an inclination that is approximately 3 to 8 degrees greater than an intended predetermined angle due to the effects of the density distribution of the focus ion beam.

In the case where, using the focus ion beam, the processing surfaces are finished with an inclination that is approximately 3 to 8 degrees greater than an intended predetermined angle, if, for example, the magnetic recording head is formed by digging in the stacking direction of the recording layer on a wafer, the inclined surfaces that are inclined by an azimuth angle are formed so that they widen towards a lower layer. The recording width of such a magnetic recording head increases as the magnetic recording head wears in the gap depth direction due to sliding between the magnetic recording head and a recording medium. As a result, stable recording may not be carried out.

Figure 18:
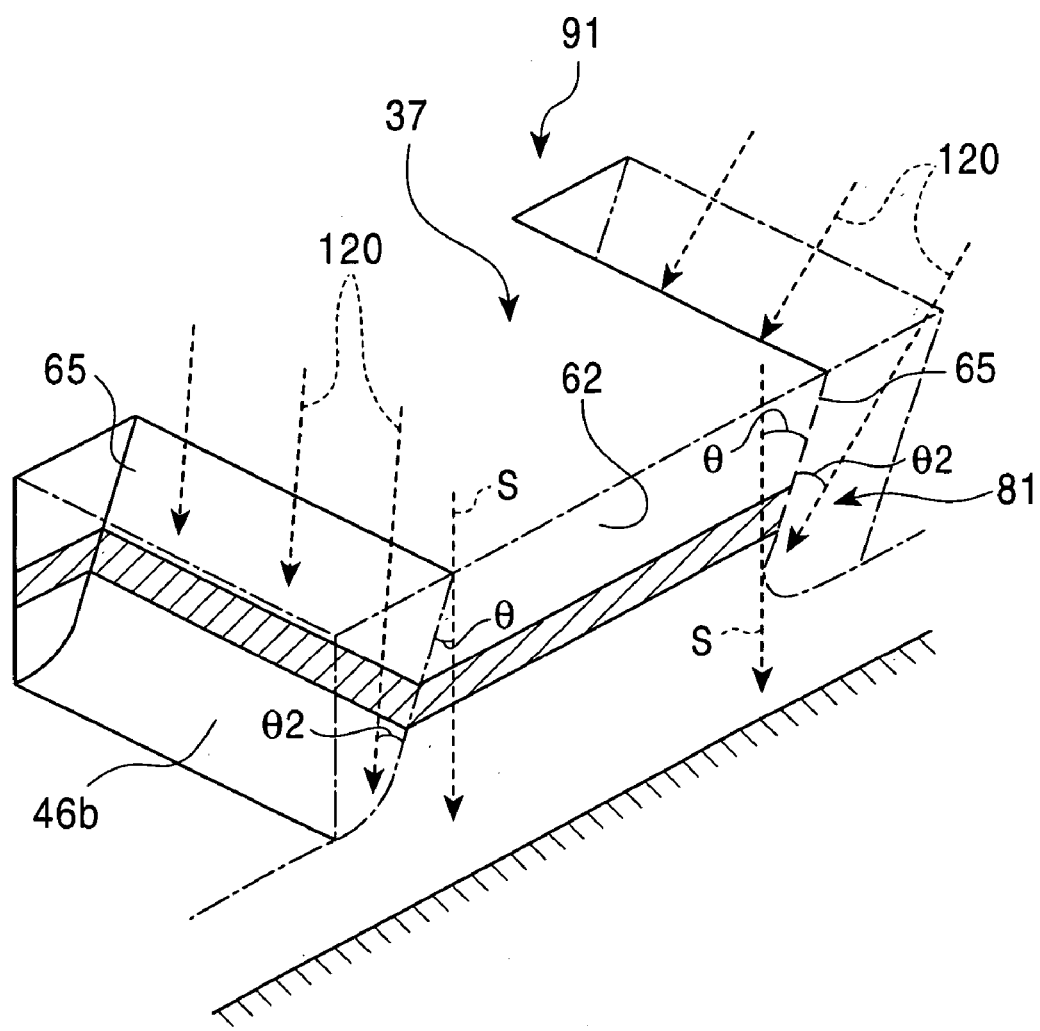
FIG. 18 illustrates another method for producing a magnetic head of the present invention.

In the present invention, in order to form a magnetic recording head that is disposed on a wafer with high precision using focus ion beams (FIB), the focus ion beams are previously tilted with respect to surfaces to be processed. In other words, as shown in FIG. 18, in a step for forming two parallel inclined surfaces 65 and 65 of a magnetic recording head 37, when the two parallel inclined surfaces 65 and 65 are designed so as to be previously inclined with an angle θ with respect to a stacking direction S of a recording layer 81, a wafer 91 where the recording layer 81 is formed is inclined by an angle θ2 so that an illuminating angle of focus ion beams 120 is greater by the angle θ2 than a design angle θ of the inclined surfaces 65 and 65. It is desirable that θ2 be, for example, 3 to 8 degrees.

Accordingly, when the wafer 91 is inclined by the angle θ2, that is, from 3 to 8 degrees, and the illuminating angle of each focus ion beam 120 is greater than the design angle θ of the inclined surfaces 65 and 65 by the angle θ2 (3 to 8 degrees), the effects of ion density distribution of the focus ion beams 120 is eliminated, the inclined surfaces 65 and 65 are inclined by θ, which is equal to the design angle, as a whole, and the inclined surfaces 65 and 65 are formed substantially in parallel without widening towards a lower layer. Since the inclined surfaces 65 and 65 are formed parallel to each other without widening towards a lower layer, leakage magnetic fields are not generated due to changes in core width, so that it is possible to achieve stable recording.

In forming the inclined surfaces 65 and 65 using such focus ion beams 120, it is desirable that a plurality of recording layers be formed on one wafer, and that they are processed by one operation. By this, it is possible to efficiently form a large number of magnetic recording heads 37.

The inclined surfaces may be formed at the recording layer using a focus ion beam by digging the recording layer in the gap depth (GD) direction from its end surface opposing the magnetic tape with a bar being severed from a wafer, in addition to by digging the recording layer on a wafer in the stacking direction from its top surface as described above.

In the case where, using a focus ion beam, the processing surfaces are finished with an inclination that is approximately 3 to 8 degrees greater than an intended predetermined angle, if, for example, the magnetic recording head is processed in the core width direction, the recording surface is formed so as to widen in the gap depth direction. In such a magnetic recording head, the core width increases in the gap depth direction from the medium opposing surface. Therefore, the recording width increases with increasing wearing of the magnetic recording head in the gap depth direction caused by sliding between the recording medium and the magnetic recording head. Therefore, stable recording may not be achieved.

Figure 19:
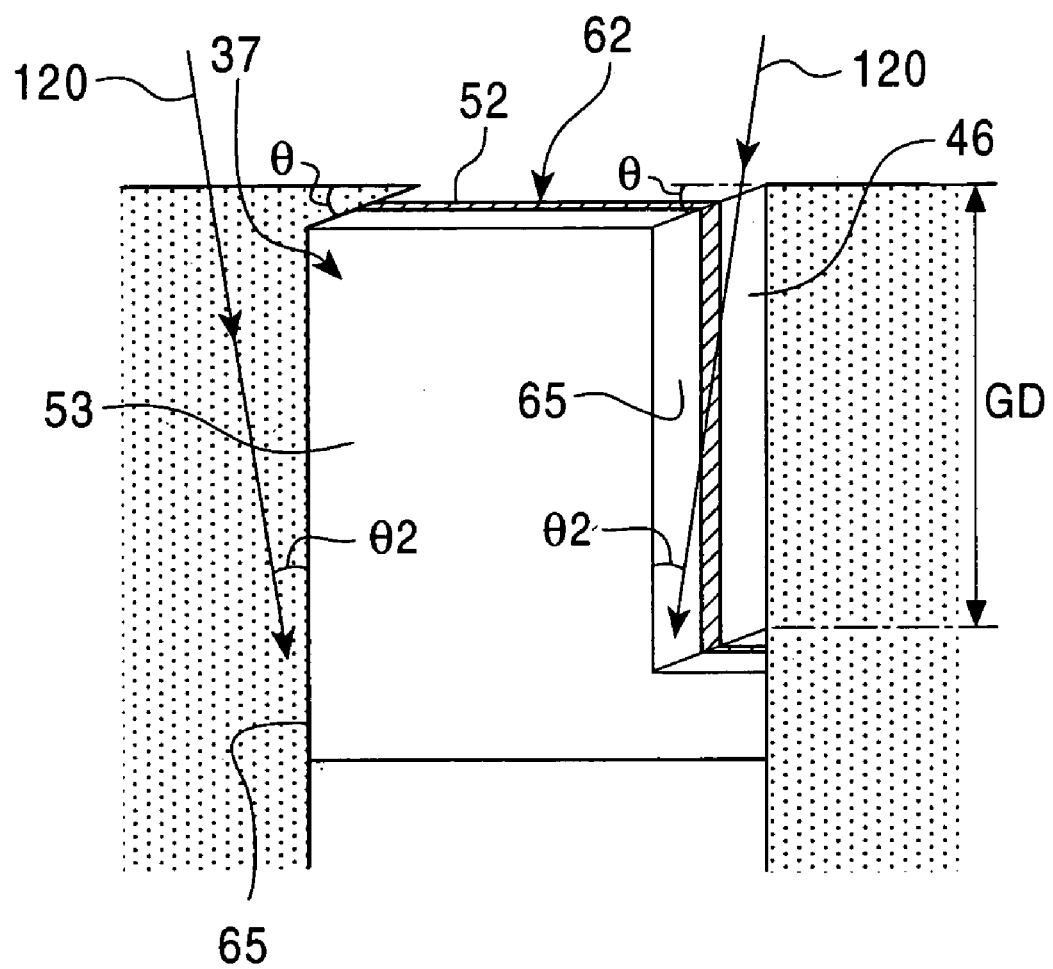
FIG. 19 illustrates still another method for producing a magnetic head of the present invention.

In the present invention, in order to form a magnetic recording head with high precision with a focus ion beam (FIB), surfaces are processed with the focus ion beam being previously set at an angle with respect to the surfaces. More specifically, as shown in FIG. 19, in forming two parallel inclined surfaces 65 and 65 that widen in the gap depth (GD) direction from an end surface 62 of a magnetic recording head 37, the illuminating angle of each focus ion beam 120 is set at an angle that is greater than an angle in the gap depth (GD) direction of the inclined surfaces 65 and 65 by a certain angle θ2 (such as 3 to 8 degrees).

In this way, if the inclined surfaces 65 and 65 are formed by irradiation with the focus ion beams 120 that are set at an illuminating angle that is from 3 to 8 degrees greater than a design angle of the processing surfaces, the effects of ion density distribution are eliminated, so that the inclined surfaces 65 and 65 are formed substantially perpendicular to the end surface 62. By forming the inclined surfaces 65 and 65 substantially perpendicular to the end surface 62, even if the end surface 62 is worn by sliding of the magnetic recording head 37 with respect to a recording medium, and is slightly abraded in the gap depth (GD) direction, the core width does not change, so that stable recording is achieved. In forming the inclined surfaces 65 and 65 with the focus ion beams 120, it is desirable that a plurality of recording layers be formed on one wafer, and that they are processed by one operation. By this, it is possible to efficiently form a large number of magnetic recording heads 37.

Although, in the embodiments, the inclined surfaces are formed on respective sides of the magnetic recording head in the core width direction, an inclined surface may be formed on one side or an end portion of the recording layer may be formed by plating. Although, in the embodiments, the recording head and the reproducing head that are integrally formed are used, the recording head alone may be used.

What is claimed is:

1. A helical scanning magnetic tape device comprising:

a magnetic head containing a magnetic recording core including an upper core layer, a lower core layer, and a gap layer disposed between the upper core layer and the lower core layer, the magnetic recording core being used for alternately forming first and second recording tracks at a predetermined angle with respect to a magnetic tape transport direction, a recording operation being performed on the first and second recording tracks at different azimuth angles, a multiple recording area being disposed at adjacent portions of the first and second recording tracks, the multiple recording area being overwritten, wherein a medium-sliding-surface-side end surface of at least one of the upper core layer and the lower core layer has a width that defines a width of the recording tracks, wherein at least one side of the end surface is set in a longitudinal direction of the first and second recording tracks, and is inclined at an angle, which is substantially equal to the azimuth angle at which the respective first or second recording track is recorded, with respect to a core width direction, and wherein the end surface extends to a predetermined death in a gap depth direction with a shape of the end surface being maintained.

2. A magnetic head according to claim 1, wherein two opposing sides of the end surface are set in the longitudinal direction of the first and second recording tracks.

3. A magnetic head according to claim 1, wherein the lower core layer comprises a base and a protrusion, the base being considerably wider than the upper core layer in a core width direction of the magnetic head, the protrusion corresponding to a portion of the base protruding towards the upper core layer.

* * * * *

UNITED STATES PATENT AND TRADEMARK OFFICE
CERTIFICATE OF CORRECTION

| | | |
|---|---|---|
| PATENT NO. | : 7,106,555 B2 | Page 1 of 1 |
| APPLICATION NO. | : 10/701343 | |
| DATED | : September 12, 2006 | |
| INVENTOR(S) | : Katsuya Kikuiri et al. | |

It is certified that error appears in the above-identified patent and that said Letters Patent is hereby corrected as shown below:

In the Claims

Columns 13-14, in claim 1, line 24, after "to a predetermined" delete "death" and substitute --depth-- in its place.

Signed and Sealed this

Twenty-sixth Day of December, 2006

JON W. DUDAS
*Director of the United States Patent and Trademark Office*